United States Patent
Dumas et al.

(10) Patent No.: US 12,323,596 B2
(45) Date of Patent: Jun. 3, 2025

(54) DEEP INTRA PREDICTION OF AN IMAGE BLOCK

(71) Applicant: INTERDIGITAL MADISON PATENT HOLDINGS, SAS, Paris (FR)

(72) Inventors: Thierry Dumas, Rennes (FR); Franck Galpin, Thorigne-Fouillard (FR); Philippe Bordes, Laille (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 77 days.

(21) Appl. No.: 17/775,019

(22) PCT Filed: Oct. 22, 2020

(86) PCT No.: PCT/EP2020/079781
§ 371 (c)(1),
(2) Date: May 6, 2022

(87) PCT Pub. No.: WO2021/089339
PCT Pub. Date: May 14, 2021

(65) Prior Publication Data
US 2022/0417516 A1    Dec. 29, 2022

(30) Foreign Application Priority Data

Nov. 8, 2019   (EP) .................................... 19306453

(51) Int. Cl.
*H04N 19/159*    (2014.01)
*H04N 19/13*    (2014.01)
(Continued)

(52) U.S. Cl.
CPC ........... *H04N 19/13* (2014.11); *H04N 19/159* (2014.11); *H04N 19/176* (2014.11); *H04N 19/182* (2014.11)

(58) Field of Classification Search
CPC .... H04N 19/13; H04N 19/159; H04N 19/176; H04N 19/182
(Continued)

(56) References Cited

U.S. PATENT DOCUMENTS 8,903,188 B2    12/2014 Gisquet et al.
10,404,989 B2    9/2019 Xu et al.
(Continued)

FOREIGN PATENT DOCUMENTS

| CN | 107318015 A | 11/2017 |
| CN | 110324638 A | 10/2019 |
| WO | 2019/209913 A1 | 10/2019 |

OTHER PUBLICATIONS

Hu et al., "Progressive Spatial Recurrent Neural Network for Intra Prediction", Institute of Electrical and Electronics Engineers (IEEE), IEEE Transactions on Multimedia, vol. 21, Issue: 12, Jun. 3, 2019, 14 pages.
(Continued)

*Primary Examiner* — Albert Kir
(74) *Attorney, Agent, or Firm* — Condo Roccia Koptiw LLP

(57) ABSTRACT

There is provided intra predicting of an image block using at least one neural network from a context comprising pixel surrounding said image block. Said intra predicting also uses an information to distinguish the missing pixels from the available pixels in the context. There are also provided encoding/decoding methods and apparatus, a device, a non-transitory computer readable medium and a computer program product.

12 Claims, 7 Drawing Sheets

(51) Int. Cl.
*H04N 19/176* (2014.01)
*H04N 19/182* (2014.01)

(58) Field of Classification Search
USPC .................................................. 375/240.02
See application file for complete search history.

(56) References Cited

U.S. PATENT DOCUMENTS

| | | | |
|---|---|---|---|
| 2013/0294511 A1 | 11/2013 | Sjoeberg et al. | |
| 2016/0119631 A1 | 4/2016 | Kawamura et al. | |
| 2017/0272757 A1 | 9/2017 | Xu et al. | |
| 2019/0273948 A1 | 9/2019 | Yin et al. | |
| 2019/0311259 A1* | 10/2019 | Cricri | G06N 3/08 |
| 2020/0137384 A1* | 4/2020 | Kwong | H04N 19/11 |
| 2020/0236349 A1* | 7/2020 | Zhai | H04N 19/61 |
| 2022/0101492 A1* | 3/2022 | Ding | H04N 19/117 |
| 2022/0191524 A1* | 6/2022 | Zhang | G06F 12/126 |
| 2022/0224901 A1* | 7/2022 | Jiang | G06N 3/082 |
| 2022/0272355 A1* | 8/2022 | Singh | H04N 19/186 |
| 2023/0281973 A1* | 9/2023 | Chen | G06N 3/084 |
| | | | 382/157 |
| 2023/0325639 A1* | 10/2023 | Zhang | G06N 3/0455 |
| | | | 706/16 |
| 2024/0205422 A1* | 6/2024 | Aksu | H04N 19/17 |

OTHER PUBLICATIONS

Dumas et al., "Iterative Training of Neural Networks for Intra Prediction", Institute of Electrical and Electronics Engineers (IEEE), IEEE Transactions on Image Processing, vol. 30, Nov. 23, 2020, 15 pages.

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

Anonymous, "Series H: Audiovisual and Multimedia Systems, Infrastructure of Audiovisual Services—Coding of Moving Video—High Efficiency Video Coding", Telecommunication Standardization Sector of ITU, Recommendation ITU T H.265 Standard, Apr. 2015, 634 pages.

Galpin et al., "CNN-Based Driving of Block Partitioning for Intra Slices Encoding", Institute of Electrical and Electronics Engineers (IEEE), 2019 Data Compression Conference (DCC), Snowbird, Utah, USA, May 13, 2019, 10 pages.

Li et al., "Fully-Connected Network-Based Intra Prediction for Image Coding", Institute of Electrical and Electronics Engineers (IEEE), IEEE Transactions on Image Processing, vol. 27, No. 7, Jul. 2018, 12 pages.

Bross et al., "Versatile Video Coding (Draft 5)", Joint Video Experts Team (JVET) of ITU-T SG 16 WP 3 and ISO/IEC JTC 1/SC 29/WG 11, Document: JVET-N18370-v10, 14th Meeting, Geneva, Switzerland, Mar. 19, 2019, 406 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Dumas et al., "Context-Adaptive Neural Network-Based Prediction for Image Compression", Institute of Electrical and Electronics Engineers (IEEE), IEEE Transactions on Image Processing, vol. 29, Aug. 16, 2019, 16 pages.

Dumas et al., "AHG11: Neural Network-Based Intra Prediction with Transform Selection in VVC", JVET-T0073, InterDigital, Joint Video Experts Team (JVET) of ITU-T SG 16 WP 3 and ISO/IEC JTC 1/SC 29, 20th Meeting, by Teleconference, Oct. 7-16, 2020, 11 pages.

* cited by examiner $Z_i = g_W^c(X_i; \phi_W^{c,i})$, $\bar{Z} = \bar{g}_W(Z_0, Z_1; \bar{\phi}_W)$, $\hat{Y}_c = g_W^t(\bar{Z}; \phi_W^t)$ ☐ group of rows/columns of reconstructed pixels $Z_i = g_W^c(X_i; \phi_W^{c,i}), \bar{Z} = \bar{g}_W(Z_0, Z_1, B; \bar{\phi}_W), \hat{Y}_c = g_W^t(\bar{Z}; \phi_W^t)$

DEEP INTRA PREDICTION OF AN IMAGE BLOCK

CROSS REFERENCE TO RELATED APPLICATIONS

This application is a U.S. National Stage Application under 35 U.S.C. 371 of International Patent Application No. PCT/EP2020/079781, filed Oct. 22, 2020, which is incorporated herein by reference in its entirety.

This application claims the benefit of European Application No. 19306453.2, filed Nov. 8, 2019, which is incorporated herein by reference in its entirety.

TECHNICAL FIELD

The domain technical field of the one or more embodiments is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (October 2014), series H: audiovisual and multimedia systems, infrastructure of audiovisual services—coding of moving video, High efficiency video coding, Recommendation ITU-T H.265"), or compared to under development video compression systems such VVC (Versatile Video Coding, a new standard being developed by JVET, the Joint Video Experts Team).

In particular, at least some embodiments further relate to improving intra prediction of an image block using neural networks from a context surrounding said image block.

SUMMARY

A deep intra predictor infers an intra prediction of a current image block using at least one neural network from a context surrounding this current image block.

A context surrounding a current image block comprises at least one pixel value located in a causal neighborhood of the current image block. Causal means that a same neighborhood may be obtained both at the encoding and decoding sides. Usually, for intra prediction, both at the encoding and decoding sides, causal neighborhood comprises reconstructed pixel values. A pixel value in the context is available when its value is accessible (obtained). In opposite, a pixel value in the context is missing when its value is not accessible.

For example, in HEVC and VVC, macro-blocks, also called Coding Tree blocks (CTBs), are hierarchically split into subblocks, and the different CTBs are scanned in raster-scan order whereas the subblocks in each CTB are scanned in Z-scan order. This sets two constraints on the context from which a deep intra predictor infers an intra prediction of the current image block. Firstly, the context can only include pixels located above and on the left side of the current image block. Secondly, the pixels on the above-right side of the current image block and/or on its bottom-left side may be missing, depending on the position of the current image block in its parent CTB.

One of the challenges is to distinguish the missing pixels from the available pixels in the context used by the deep intra predictor.

This is solved and addressed by the general aspects described herein, which are directed to an intra prediction of a current image block using at least one neural network and an information to distinguish the missing pixels from the available pixels in the context.

According to a first aspect, there is provided a method. The method comprises intra predicting an image block using at least one neural network from a context comprising pixels surrounding said image block. Said intra predicting also uses an information to distinguish the missing pixels from the available pixels in the context.

In one embodiment, said information is a mask value, wherein the method further comprises a pre-processing of the context before the intra-predicting in which a pre-processed context is obtained by assigning said mask value to the missing pixels in the context.

This way, any ambiguities are removed between the unmasked portions of the context with meaningful information and the masked portions of the context with missing information for the deep intra predictor.

In another embodiment, said information is a binary vector indicating the positions of the missing pixels in the context, and wherein intra-predicting the image block is responsive of the binary vector.

This way, the binary vector removes any ambiguities on the positions of the missing pixels in the context.

According to another aspect, there is provided a second method. The method comprises determining an intra prediction an image block to be encoded using at least one neural network from a context comprising pixels surrounding said image block, wherein said intra predicting also uses an information to distinguish the missing pixels from the available pixels in the context; and encoding the image block based on said intra prediction.

According to another aspect, there is provided a third method. The method comprises determining an intra prediction an image block to be decoded using at least one neural network from a context comprising pixels surrounding said image block, wherein said intra predicting also uses an information to distinguish the missing pixels from the available pixels in the context; and decoding the image block based on said intra prediction.

According to another aspect, there is provided an apparatus. The apparatus comprises one or more processors, wherein the one or more processors are configured to determine an intra prediction an image block to be encoded using at least one neural network from a context comprising pixels surrounding said image block, wherein said intra predicting also uses an information to distinguish the missing pixels from the available pixels in the context; and encoding the image block based on said intra prediction.

According to another aspect, there is provided an apparatus. The apparatus comprises one or more processors, wherein the one or more processors are configured to determine an intra prediction an image block to be decoded using at least one neural network from a context comprising pixels surrounding said image block, wherein said intra predicting also uses an information to distinguish the missing pixels from the available pixels in the context; and decoding the image block based on said intra prediction.

According to another general aspect of at least one embodiment, there is provided a non-transitory computer readable medium containing data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated. The drawings show.

DETAILED DESCRIPTION

Deep Neural Network Based Intra Prediction

Using neural networks for intra predicting a current image block Y refers to a deep intra predictor that provides a model of dependencies between said current image block and its context X surrounding the current image block.

An example of deep intra predictor is described in the article entitled "Context-adaptive neural network-based prediction for image compression", Thierry Dumas, Aline Roumy, Christine Guillemot, arXiv:1807.06244v2, August 2019). Firstly, a set of neural network architectures, denoted Prediction Neural Networks Set (PNNS), based on both fully-connected and/or convolutional neural networks is usually trained on pairs of a block and its context extracted from a set of training images. Next, one of the neural networks of the PNNS is selected to provide an intra prediction of the current image block from a context surrounding the current image block.

Figure 1:
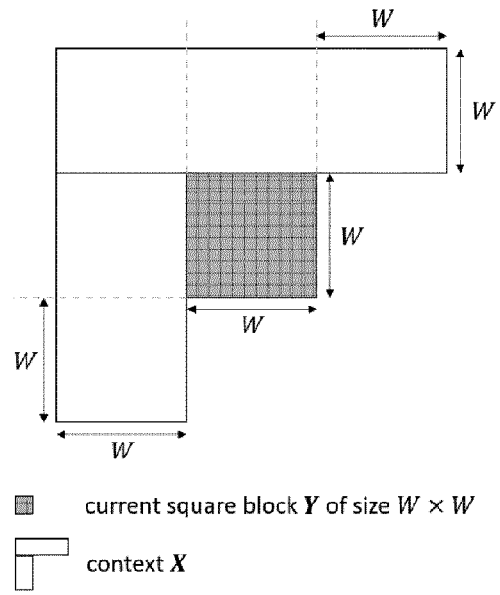
FIG. 1 shows an example of an image block and its context.

In this article, the context X is composed of pixels located above the current image block Y and on its left side, similarly to the set of reconstructed reference samples for the intra prediction in VVC. But, unlike it, the context X is extended towards the left and the top as illustrated, for example, in FIG. 1. Thanks to this extension, the deep intra predictor can learn a relationship between the spatial correlations in its input context X and the intra prediction $\hat{Y}$ of the current image block Y it gives.

The transformation of the context X into the intra prediction $\hat{Y}$ of a W×W block Y via either a fully-connected neural network $f_w$, parametrized by $\theta_m$, or a convolutional neural network $g_m$, parametrized by $\varnothing_m$, is described in (1):

$$X_c = X - \alpha \quad (1)$$
$$\hat{Y}_c = \begin{cases} f_m(X_c; \theta_m) \\ g_m(X_c; \varnothing_m) \end{cases}$$
$$\hat{Y} = \max(\min(\hat{Y}_c + \alpha, 255), 0)$$

where α is a normalizing value equals to a mean pixel intensity computed over all training images to center the pixel values of the context X. The subscript c stands for centered.

Then, α is subtracted from each image block to be predicted and its context during the training phase. During the test phase, for intra predicting a current image block, α is subtracted from the context X (see (1)) and α is added to the intra prediction $\hat{Y}_c$ (output of the deep intra predictor).

Figure 2:
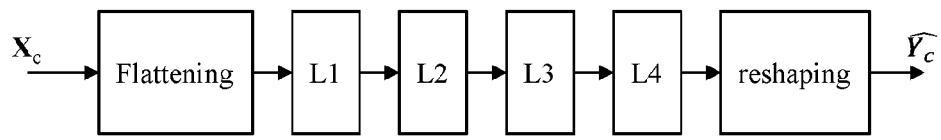
FIGS. 2 and 3 illustrate examples of architectures of neural networks in accordance with prior art.
Figure 3:
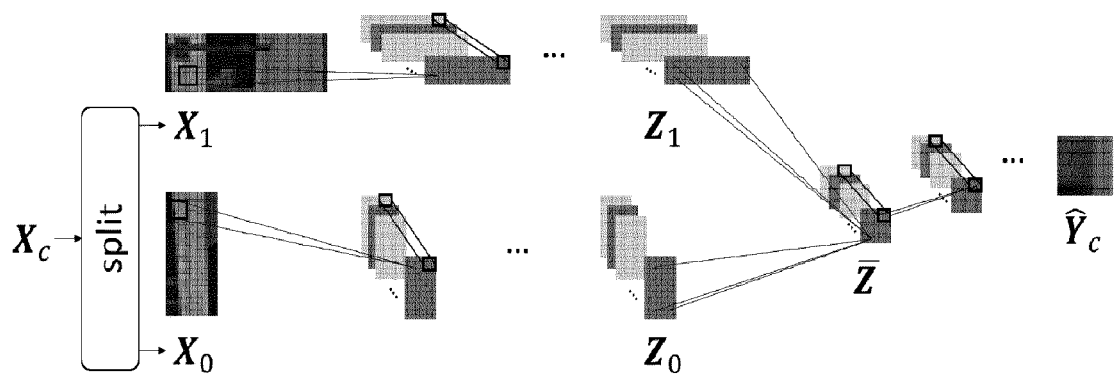

FIGS. 2 and 3 illustrate examples of architectures of neural networks of the PNNS.

The first operation for both architectures consists in formatting the context to ease the computations in the neural network.

In the case of a fully-connected neural network, as illustrated in FIG. 2, all elements in the context $X_c$ are connected such that there is no need to keep the 2D structure of the context. Therefore, the context $X_c$ is first vectorized (flattening), and fast vector-matrix arithmetics can be used.

For example, the fully-connected architecture $f_w$ is composed of 4 fully-connected layers L1, L2, L3 and L4. $\theta_w$ gathers weight and biases of the four fully-connected layers. The first layer L1 computes an overcomplete representation of the context $X_c$ to reach output coefficients. Overcompleteness is chosen as it is observed empirically that overcomplete representations in early layers boost the performance of neural networks. The next two layers (L2 and L3) keep the number of coefficients unchanged, while the last layer L4 reduces it to provide a predicted image block.

In the case of a convolutional neural network, as illustrated in FIG. 3, fast computation of 2D filtering requires to keep the 2D structure of the context $X_c$. Moreover, again for fast computation, the shape of the input to the convolution has to be rectangular. That is why the context is split into two rectangles $X_0$ and $X_1$ which are then processed by distinct convolutions.

The first task of the convolutional architecture is the computation of features characterizing the dependencies between the elements in $X_0$. $X_0$ is thus fed into a stack of convolutional layers $g_w^c$ parametrized by $\varnothing_w^{c,0}$. This yields a stack $Z_0$ of $l \in \mathbb{N}^*$ feature maps. Similarly, $X_1$ is fed into another stack of convolutional layers $g_w^c$ parametrized by $\varnothing_w^{c,1}$. This yields a stack $Z_1$ of l feature maps. All the elements in the context can be relevant for predicting any image block pixel. This implies that the information associated to all spatial locations in the context has to be merged. That is why the next layer in the convolutional architecture obtains a merged stack Z by merging spatially the stacks $Z_0$ and $Z_1$ using a function $\bar{g}_W$ parametrized by $\bar{\varnothing}_W$. More precisely, for $i \in [1; l]$, all the coefficients of the $i^{th}$ feature map of $Z_0$ and of the $i^{th}$ feature map of Z, are merged through parametric affine combinations.

The last task of the convolutional architecture is to merge the information of the different feature maps of Z. Z is thus fed into a stack of transposed convolutional layers $g_W^t$ parametrized by $\varnothing_W^t$. This yields the intra prediction $\hat{Y}_c$ before post-processing.

Missing Pixels in the Context Fed into a Neural Network

In HEVC and VVC, an image is split into Coding Tree Units (CTUs). A CTU contains a luminance Coding Tree Image block (CTB), two chrominance CTBs, and syntax elements. The CTBs are processed one at a time, in raster-scan order. Each CTB can be split hierarchically into Coding Image blocks (CBs). The CBs in a CTB are processed in Z-scan order.

Consequently, in HEVC for instance, the size of an image block to be predicted can be either 64×64, 32×32, 16×16, 8×8 or 4×4. This means that 5 neural networks are needed, one for each size of image block to be predicted. The deep intra predictor is thus made of the 5 neural networks according to this instance.

In VVC, as the hierarchical splitting is more sophisticated, a image block to be predicted can be of size either 128×128, 64×64, 32×32,16×16, 8×8 or 4×4. Besides, it can also be rectangular, e.g. of size 4×8. In this case, a solution is to assign one neural network per image block size to build the deep intra predictor.

In HEVC and VVC, given that the image blocks are processed in raster-scan order combined with Z-scan order, when a deep intra predictor infers a prediction of the current image block from its context, pixels may be missed on the above-right side of the current image block and on its bottom-left side, depending on the position of the current image block in its CTB.

Figure 4:
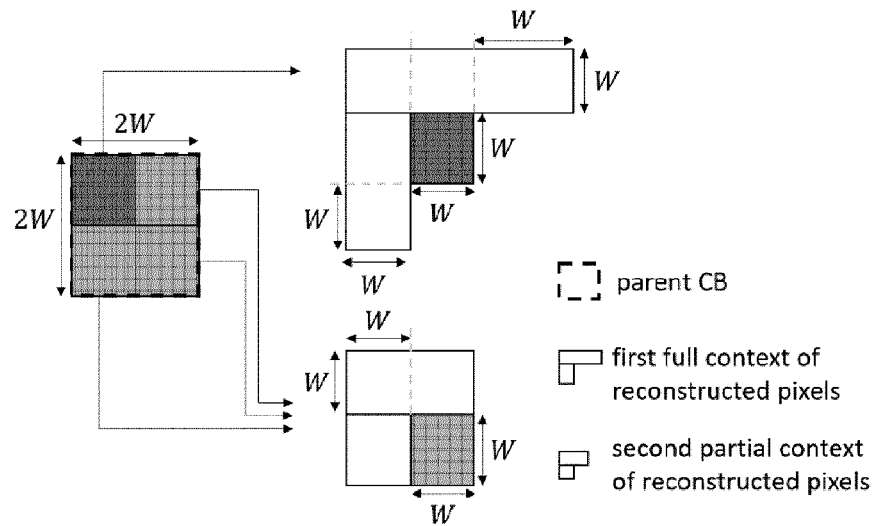
FIG. 4 shows examples of full and partial contexts.

To cope with this, an approach is to design several contexts of the image blocks of a given size, and one neural network may be trained per context. More precisely, a first context is full, corresponding to the case where no pixel is missing, whereas a second context is partial, corresponding to the case with the maximum number of missing pixels. During prediction inside HEVC, if the current image block is located at the top-left of its parent image block CB, the first context is used. In any other case, the second context is used as illustrated in FIG. 4. But, this approach increases the number of models to be used inside HEVC and thus, parameters to be stored in memory. Moreover, in the case where pixels are missing on the bottom-left side of the current image block, but those on the above-right side of the image block are available, the latter available pixels are not included in the second context, which is a waste of information for neural network-based prediction.

Generally speaking, at least one of the embodiments relate to a method comprising intra predicting a current image block Y using at least one neural network from a context X comprising pixel surrounding said current image block. Said intra predicting also uses an information INF to distinguish the missing pixels from the available pixels in the context.

Figure 5:
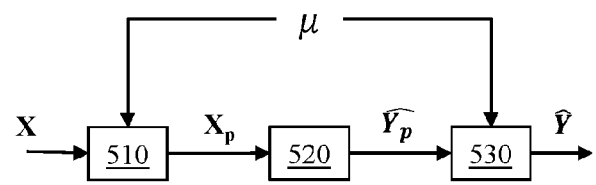
FIG. 5 illustrates a flowchart of a method of intra-predicting an image block in accordance with at least one embodiment.

In one embodiment of the method, illustrated in FIG. 5, the information INF is a mask value. The method then further comprises a pre-processing of the intra-predicting (step 510) in which a pre-processed context $X_p$ (p stands for "pre-processed") is obtained by assigning the mask value to the missing pixels in X. A pre-processed intra prediction $\hat{Y}_p$ is then obtained from the pre-processed context $X_p$ using a deep intra predictor as described, for example, in FIGS. 1-3 (step 520). Said mask value is outside the range of values taken by the available pixels in the context after the pre-processing.

By setting the mask value to any value in $]-\infty, -255] \cup [255, +\infty[$, the mask value is necessarily outside the range of values taken by the available pixels after pre-processing for a bit-depth of 8 of the available pixels.

As the mask value in $X_p$ is out of the range of the unmasked values in $X_p$, there is no ambiguity between the uninformative masked portions of the context and its informative unmasked portions for the neural network fed with $X_p$. This does not occur for any other mask value that is inside the range of the unmasked values in $X_p$, such as a mean pixel intensity computed over all training images.

In a variant of FIG. 5, an average value (mean) $\mu$ of the available pixels in the context X is subtracted from said available pixels. The method further comprises a post-processing of the pre-processed intra prediction $\hat{Y}_p$ (step 530) in which an intra prediction $\hat{Y}$ of the current image block Y is obtained by adding the average value $\mu$ to the pre-processed intra prediction $\hat{Y}_p$.

This variant is used because, during the training phase, the minimization of an objective function over the neural network parameters is shown to converge well when each coefficient of the input data to the neural network, here the context, is close to zero on average over the training data, and the same preprocessing of the input data has to be applied during the training phase and the test phase.

Mathematically speaking, steps 510-530 may be expressed by equation (2).

$$X_p = \text{cover\_missing}(X - \mu) \quad (2)$$
$$\hat{Y}_p = \begin{cases} f_W(X_p; \theta_W) \\ g_W(X_p; \varnothing_W) \end{cases}$$
$$\hat{Y} = \text{round}(\min(\hat{Y}_p + \mu, 255), 0)$$

where the function cover_missing covers the missing reconstructed pixels in its input context.

In variant, the pre-processed context $X_p$ (equation (2)) may be adapted to the bit-depth of the current image block Y and the bit-depth of the training images used for training the PNNS.

For example, predicting an image block of bit-depth 10 using a PNNS trained on 8-bit training images, a scaling may be used. Equation (2) is thus replaced by equation (3):

$$X_p = \text{cover\_missing}\left(\frac{X}{4.0} - \mu\right) \quad (3)$$
$$\hat{Y}_p = \begin{cases} f_W(X_p; \theta_W) \\ g_W(X_p; \varnothing_W) \end{cases}$$
$$\hat{Y} = \text{round}(\min(\max(4.0(\hat{Y}_p + \mu), 0.0), 1023.0))$$

Figure 5A:
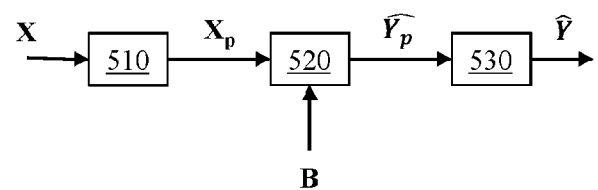
FIG. 5a illustrates a flowchart of a method of intra-predicting an image block in accordance with at least one embodiment.

In another embodiment of the method, illustrated in FIG. 5a, the information INF is a binary vector $B \in \{0,1\}^K$ indicating the positions of the missing pixels in the context X. The binary vector B fed together with the context X into the deep intra prediction step 520. K means the number of binary vector elements $B_k$. The intra-predicting of the image block is thus responsive of the binary vector.

In variant, the binary vector $B \in \{0,1\}^K$ indicating the positions of the missing pixels in the context $X_c$. The binary vector B fed together with the context $X_c$ into the deep intra prediction step 520.

In a variant of FIG. 5a, an average value (mean) µ of the available pixels in the context X is subtracted from said available pixels. The method further comprises a post-processing of the pre-processed intra prediction $\bar{r}_p$ (step 530) in which an intra prediction Ŷ of the current image block Y is obtained by adding the average value µ to the pre-processed intra prediction $\bar{r}_p$.

This variant is used because, during the training phase, the minimization of an objective function over the neural network parameters is shown to converge well when each coefficient of the input data to the neural network, here the context, is close to zero on average over the training data, and the same preprocessing of the input data has to be applied during the training phase and the test phase.

Any one-to-one mapping between each coefficient of the binary vector and the position of missing or available pixels in the context may be used.

In one embodiment of one-to-one mapping, each binary vector coefficient $B_k$ refer to the position of at least one consecutive row/column of missing or available pixels in the context.

For example, each binary vector coefficient $B_k$ referring to the position of at least one consecutive row/column of missing pixels is set to 1 and each binary vector coefficient $B_k$ referring to the position of a row/column of available pixels is set to 0.

Figure 6:
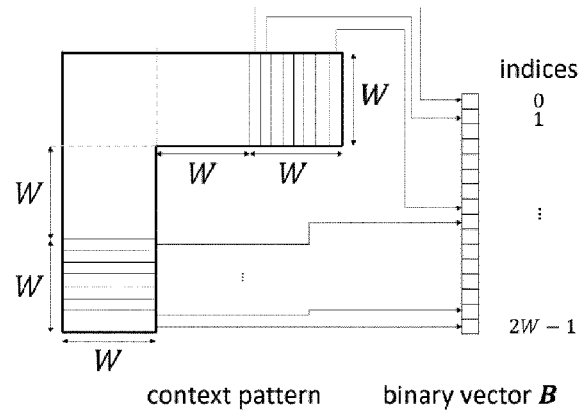
FIG. 6 shows an example of one-to-one mapping of between coefficient of the binary vector and the position of pixels in the context in accordance with at least one embodiment.

In variant of this embodiment, illustrated in FIG. 6, each binary vector coefficient $B_k$ refers to the position of one row/column of missing or available pixels.

For example, the current image block to be predicted is of size W×W, K=2 W, and the first W vector coefficients $B_k$ refer to the positions of the W columns of missing or available pixels on the above-right side of the current image block, from left to right, while the last W vector coefficients in $B_k$ refer to the positions of the W rows of missing or available pixels on the bottom-left side of the current image block, from top to bottom.

In variant of this embodiment, each binary vector coefficient $B_k$ refers to the position of at least two consecutive rows/columns of missing or available pixels.

Figure 7:
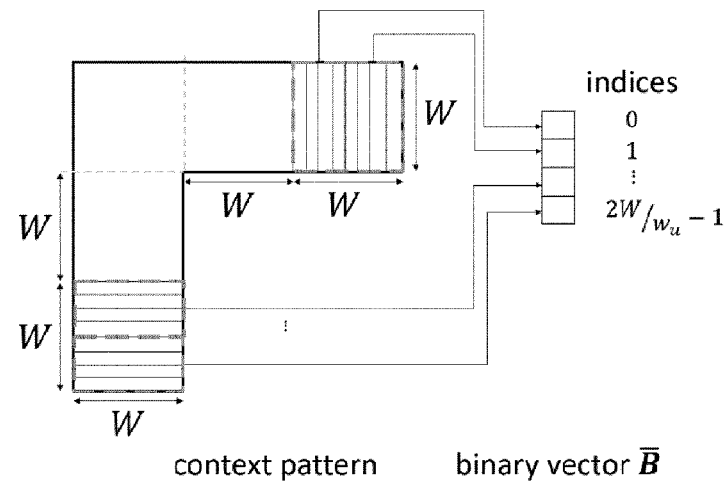
FIG. 7 shows another example of one-to-one mapping between coefficient of the binary vector and the position of pixels in the context in accordance with at least one embodiment.

FIG. 7 shows an example of one-to-one mapping between coefficient of the binary vector and the position of four consecutive rows/columns of missing or available pixels.

For example, in HEVC and VVC, there exists a minimum image block size $w_u \times w_u$ for each channel in an image partitioning. Missing or available pixels in the context can be grouped together, each group gathering $w_u$ columns. Similarly, the consecutive rows of missing or available pixels in the context can be grouped together, each group containing $w_u$ rows. Then, in the binary vector $$B \in \{0, 1\}^{\frac{W}{w_u} + \frac{W}{w_u}}$$

may be defined.

For example, the current block to be predicted is of size H×W, the first $W/w_u$ vector coefficients $B_k$ refer to the positions of the $W/w_u$ groups of columns of missing or available pixels on the above-right side of the current image block, from left to right, while the last $H/w_u$ vector coefficients $B_k$ refer to the positions of the $H/w_u$ groups of rows of missing or available pixels on the bottom-left side of the current image block, from top to bottom.

Examples illustrated in FIGS. 6 and 7 assume that the number of columns of missing or available pixels on the above-right side of the current image block and the number of rows of missing or available pixels on the bottom-left side of the current image block, are equals to W. But, this is not limitative because the present embodiments apply for any number of columns of missing or available pixels on the above-right side of the current image block and any number of rows of missing or available pixels on the bottom-left side of the current image block.

Figure 8:
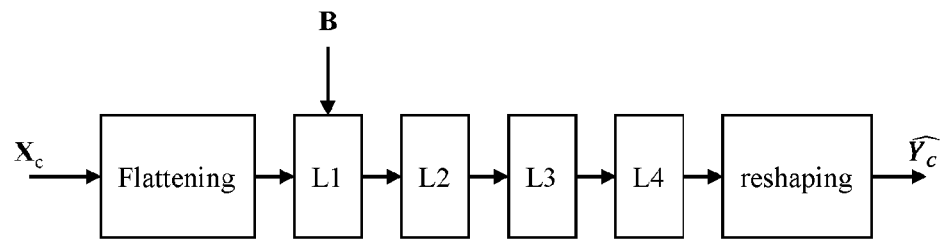
FIGS. 8 and 9 illustrate examples of architectures of neural networks in accordance with at least one embodiment.

In variant, in the case of a fully-connected neural network as illustrated in FIG. 8, the binary vector B may fed into its first layer L1 as the whole spatial information in the context is merged in this layer. The binary vector B gives the neural network explicit indications on which pixels in the context are missing and which pixels are available. This way, it is able to learn how to ignore the missing pixels during the training phase.

Figure 9:
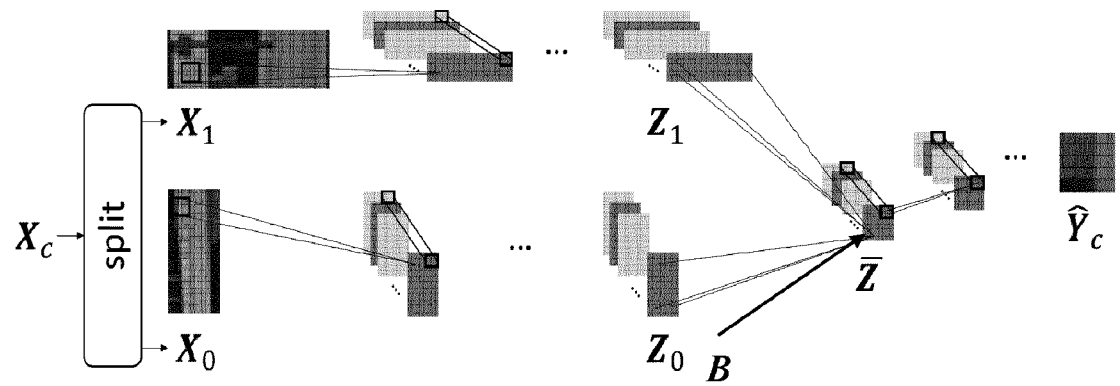

In variant, in the case of a convolutional neural network as illustrated in FIG. 9, the binary vector B may fed into a layer containing fully-connectivity as, only in this layer, the whole spatial information in the context is combined. Thus, the merged stack $\bar{Z} = \bar{g}_w(Z_0, Z_1, B; \varnothing_W)$.

According to another aspect, there is provided a method comprises determining an intra prediction an image block to be encoded using at least one neural network from a context comprising pixels surrounding said image block, wherein said intra predicting also uses an information to distinguish the missing pixels from the available pixels in the context; and encoding the image block based on said intra prediction.

In variant, the method further comprises transmitting an information relative to the intra prediction of the current image block, as for example, an information for accessing or defining an access to a neural network used for intra predicting.

According to another aspect, there is provided a method comprises determining an intra prediction an image block to be decoded using at least one neural network from a context comprising pixels surrounding said image block, wherein said intra predicting also uses an information to distinguish the missing pixels from the available pixels in the context; and decoding the image block based on said intra prediction.

In variant, the method further comprises receiving an information relative to the intra prediction of the current image block, as for example, an information for accessing or defining an access to a neural network used for intra predicting.

For example, in HEVC, when the deep intra predictor is systematically in competition with other intra predictor, said information may be a flag that is written to the bitstream before all the other flags for intra prediction. The value 1 may indicate that the deep intra predictor is selected for predicting the current image block. In this case, no other flag for intra prediction is written to the bitstream. The value 0 means that another intra predictor is selected.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 10:
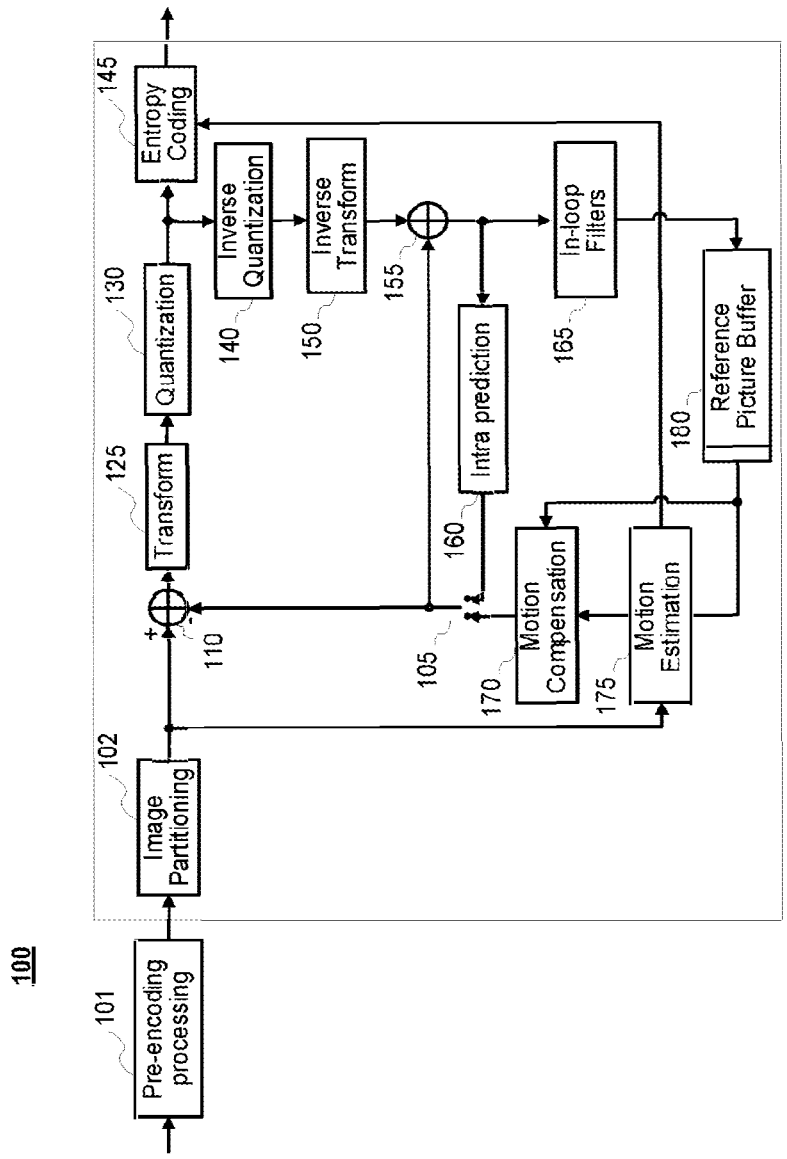
FIG. 10 illustrates a block diagram of an example of an encoder in which various aspects and embodiments are implemented.
Figure 11:
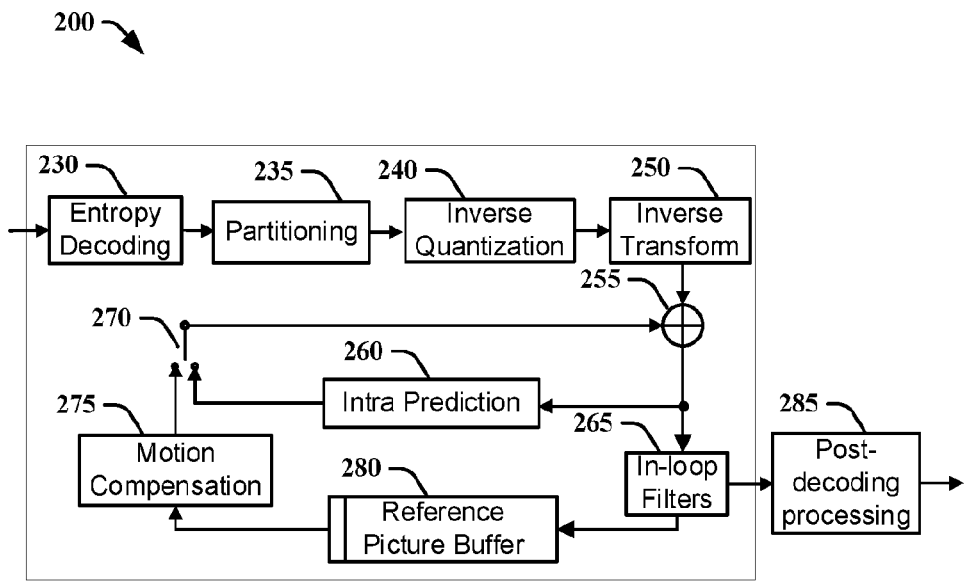
FIG. 11 illustrates a block diagram of a video decoder in which various aspects and embodiments are implemented.
Figure 12:
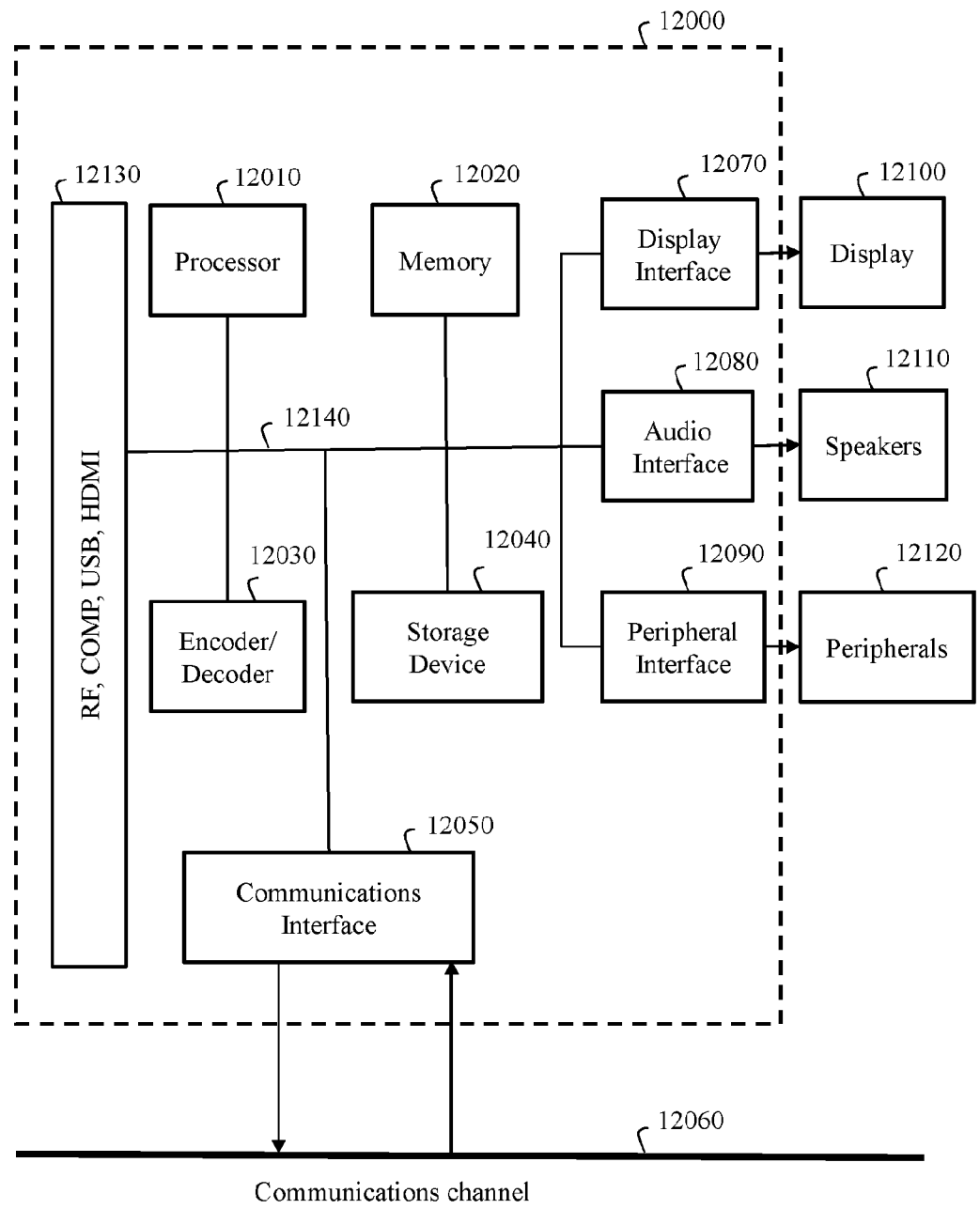
FIG. 12 illustrates a block diagram of an example of a system in which various aspects and embodiments are implemented.

The aspects described and contemplated in this application can be implemented in many different forms. FIGS. 10, 11 and 12 provide some embodiments, but other embodiments are contemplated and the discussion of FIGS. 10, 11 and 12 does not limit the breadth of the implementations.

At least one of the aspects generally relates to video encoding and decoding. These and other aspects can be implemented as a method, an apparatus, a computer readable medium having stored thereon instructions for encoding or decoding video data according to any of the above described methods, or a computer program product comprising instructions which, when the program is executed by a computer, cause the computer to carry out any of the above described method.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction module 160 of a video encoder 100 of FIG. 10 and the intra prediction module 260 of decoder 200 as shown in FIG. 11 and FIG. 12. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, number of intra prediction mode, parameters of the neural networks (layer, output range, threshold). The specific values are for example purposes and the aspects described are not limited to these specific values.

FIG. 10 illustrates a block diagram of an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-encoding processing (101), and attached to the bitstream.

In the encoder 100, an image is encoded by the encoder elements as described below. The image to be encoded is partitioned (102) and processed in units of, for example, CUs. Each unit (typically an image block) is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted unit from the original unit.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded unit to provide a reference for further predictions. The quantized transform coefficients are de-quantized (140) and inverse transformed (150) to decode prediction residuals. Combining (155) the decoded prediction residuals and the predicted unit, an unit is reconstructed. In-loop filters (165) are applied to the reconstructed unit to perform, for example, image deblocking/SAO (Sample Adaptive Offset) filtering to reduce encoding artifacts. The filtered unit is stored at a reference picture buffer (180).

FIG. 11 illustrates a block diagram of a video decoder 200. Variations of this decoder 200 are contemplated, but the decoder 200 is described below for purposes of clarity without describing all expected variations.

In the decoder 200, a bitstream is decoded by the decoder elements as described below.

Video decoder 200 generally performs a decoding pass reciprocal to the encoding pass as described in FIG. 10. The decoder 200 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the image according to the decoded picture partitioning information. The transform coefficients are de-quantized (240) and inverse transformed (250) to decode the prediction residuals. Combining (255) the decoded prediction residuals and the predicted unit, a unit (typically an image block) is reconstructed. The predicted unit can be obtained (270) from intra prediction (260) or motion-compensated prediction (i.e., inter prediction) (275). In-loop filters (265) are applied to the reconstructed unit. The filtered unit is stored at a reference picture buffer (280).

The decoded image can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 12 illustrates a block diagram of an example of a system in which various aspects and embodiments are implemented. System 12000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 12000, singly or in combination, can be embodied in a single integrated circuit (IC), multiple ICs, and/or discrete components. For example, in at least one embodiment, the processing and encoder/decoder elements of system 12000 are distributed across multiple ICs and/or discrete components. In various embodiments, the system 12000 is communicatively coupled to one or more other systems, or other electronic devices, via, for example, a communications bus or through dedicated input and/or output ports. In various embodiments, the system 12000 is configured to implement one or more of the aspects described in this document.

The system 12000 includes at least one processor 1010 configured to execute instructions loaded therein for implementing, for example, the various aspects described in this document. Processor 1010 can include embedded memory, input output interface, and various other circuitries as known in the art. The system 12000 includes at least one memory 12020 (e.g., a volatile memory device, and/or a non-volatile memory device). System 12000 includes a storage device 12040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 12040 can include an internal storage device, an attached storage device (including detachable and non-detachable storage devices), and/or a network accessible storage device, as non-limiting examples.

System 12000 includes an encoder/decoder module 12030 configured, for example, to process data to provide an encoded video or decoded video, and the encoder/decoder module 12030 can include its own processor and memory. The encoder/decoder module 12030 represents module(s) that can be included in a device to perform the encoding and/or decoding functions. As is known, a device can include one or both of the encoding and decoding modules. Additionally, encoder/decoder module 12030 can be implemented as a separate element of system 12000 or can be incorporated within processor 12010 as a combination of hardware and software as known to those skilled in the art.

Program code to be loaded onto processor 12010 or encoder/decoder 12030 to perform the various aspects described in this document can be stored in storage device 12040 and subsequently loaded onto memory 12020 for execution by processor 12010. In accordance with various embodiments, one or more of processor 12010, memory 12020, storage device 12040, and encoder/decoder module 12030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 12010 and/or the encoder/decoder module 12030 is used to store instructions and to provide working memory for processing that is needed during encoding or decoding.

In other embodiments, however, a memory external to the processing device (for example, the processing device can be either the processor 12010 or the encoder/decoder module 12030) is used for one or more of these functions. The external memory can be the memory 12020 and/or the storage device 12040, for example, a dynamic volatile memory and/or a non-volatile flash memory.

In several embodiments, an external non-volatile flash memory is used to store the operating system of, for example, a television.

In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 12000 can be provided through various input devices as indicated in module 12130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 12, include composite video.

In various embodiments, the input devices of module 12130 have associated respective input processing elements as known in the art. For example, the RF portion can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter.

In various embodiments, the RF portion includes an antenna.

Additionally, the USB and/or HDMI terminals can include respective interface processors for connecting system 12000 to other electronic devices across USB and/or HDMI connections.

It is to be understood that various aspects of input processing, for example, Reed-Solomon error correction, can be implemented, for example, within a separate input processing IC or within processor 12010 as necessary.

Similarly, aspects of USB or HDMI interface processing can be implemented within separate interface ICs or within processor 12010 as necessary.

The demodulated, error corrected, and demultiplexed stream is provided to various processing elements, including, for example, processor 12010, and encoder/decoder 12030 operating in combination with the memory and storage elements to process the data stream as necessary for presentation on an output device.

Various elements of system 12000 can be provided within an integrated housing. Within the integrated housing, the various elements can be interconnected and transmit data therebetween using suitable connection arrangement $12^2140$, for example, an internal bus as known in the art, including the Inter-IC (I2C) bus, wiring, and printed circuit boards.

The system 12000 includes communication interface 12050 that enables communication with other devices via communication channel 12060. The communication interface 12050 can include, but is not limited to, a transceiver configured to transmit and to receive data over communication channel 12060. The communication interface 12050 can include, but is not limited to, a modem or network card and the communication channel 12060 can be implemented, for example, within a wired and/or a wireless medium.

Data is streamed, or otherwise provided, to the system 12000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 12060 and the communications interface 12050 which are adapted for Wi-Fi communications. The communications channel 12060 of these embodiments is typically connected to an access point or router that provides access to external networks including the Internet for allowing streaming applications and other over-the-top communications.

Other embodiments provide streamed data to the system 12000 using a set-top box that delivers the data over the HDMI connection of the input image block 12130. Still other embodiments provide streamed data to the system 12000 using the RF connection of the input module 12130.

As indicated above, various embodiments provide data in a non-streaming manner.

Additionally, various embodiments use wireless networks other than Wi-Fi, for example a cellular network or a Bluetooth network.

The system 12000 can provide an output signal to various output devices, including a display 12100, speakers 12110, and other peripheral devices 12120.

The display 12100 of various embodiments includes one or more of, for example, a touchscreen display, an organic light-emitting diode (OLED) display, a curved display, and/or a foldable display. The display 12100 can be for a television, a tablet, a laptop, a cell phone (mobile phone), or other device. The display 12100 can also be integrated with other components (for example, as in a smart phone), or separate (for example, an external monitor for a laptop).

The other peripheral devices 12120 include, in various examples of embodiments, one or more of a stand-alone digital video disc (or digital versatile disc) (DVR, for both terms), a disk player, a stereo system, and/or a lighting system.

Various embodiments use one or more peripheral devices 12120 that provide a function based on the output of the system 12000. For example, a disk player performs the function of playing the output of the system 12000.

In various embodiments, control signals are communicated between the system 12000 and the display 12100, speakers 12110, or other peripheral devices 12120 using signaling such as AV.Link, Consumer Electronics Control (CEC), or other communications protocols that enable device-to-device control with or without user intervention.

The output devices can be communicatively coupled to system 12000 via dedicated connections through respective interfaces 12070, 12080, and 12090.

Alternatively, the output devices can be connected to system 12000 using the communications channel 12060 via the communications interface 12050.

The display 12100 and speakers 12110 can be integrated in a single unit with the other components of system 12000 in an electronic device such as, for example, a television.

In various embodiments, the display interface 12070 includes a display driver, such as, for example, a timing controller (T Con) chip.

The display 12100 and speaker 12110 can alternatively be separate from one or more of the other components, for example, if the RF portion of input 12130 is part of a separate set-top box.

In various embodiments in which the display 12100 and speakers 12110 are external components, the output signal can be provided via dedicated output connections, including, for example, HDMI ports, USB ports, or COMP outputs.

The embodiments can be carried out by computer software implemented by the processor 12010 or by hardware, or by a combination of hardware and software.

As a non-limiting example, the embodiments can be implemented by one or more integrated circuits.

The memory 12020 can be of any type appropriate to the technical environment and can be implemented using any appropriate data storage technology, such as optical memory devices, magnetic memory devices, semiconductor-based memory devices, fixed memory, and removable memory, as non-limiting examples.

The processor 12010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display.

In various embodiments, such processes include one or more of the processes typically performed by a decoder, for example, entropy decoding, inverse quantization, inverse transformation, and differential decoding.

In various embodiments, such processes also, or alternatively, include processes performed by a decoder of various implementations described in this application, for example, receiving an information relative to an intra prediction using neural network for a current image block; determining an intra prediction for the current image block using a neural network applied to a context surrounding the current image block; and decoding the image block using the determined intra prediction.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding.

In an analogous way to the above discussion about "decoding", "encoding" as used in this application can encompass all or part of the processes performed, for example, on an input video sequence in order to produce an encoded bitstream.

In various embodiments, such processes include one or more of the processes typically performed by an encoder, for example, partitioning, differential encoding, transformation, quantization, and entropy encoding.

In various embodiments, such processes also, or alternatively, include processes performed by an encoder of various implementations described in this application, for example, determining an intra prediction for the current image block using a neural network applied to a context surrounding the current image block; encoding the current image block based on the intra prediction; and transmitting the encoded current image block.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization.

In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion. However, according to at least one embodiment, the rate distortion optimization in the encoding is removed as the deep intra prediction mode is the only available mode for intra prediction.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program).

An apparatus can be implemented in, for example, appropriate hardware, software, and firmware.

The methods can be implemented in, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for deep intra prediction.

In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types.

The invention claimed is:

1. A method comprising:
   assigning a mask value to unavailable pixels in a context comprising pixels surrounding a first image block, wherein the mask value is outside a range of available pixels in the context;
   subtracting an average value of the available pixels in the context from the available pixels in the context;
   providing the context to at least one neural network;
   obtaining, from the at least one neural network, a second image block comprising intra prediction of the first image block; and
   post-processing the second image block by adding the average value to the intra prediction of the first image block.

2. The method of claim 1, further comprising adapting the context values from a bit-depth of the first image block to a bit-depth of training images used for training said at least one neural network by scaling the context values before being input to the at least one neural network and inverse scaling the second image block after post-processing from the bit-depth of the training images to the bit-depth of the first image block.

3. The method of claim 1, further comprising:
   encoding the first image block based on said intra prediction.

4. The method of claim 3, the method further comprising transmitting an information for accessing or defining an access to a neural network used for intra predicting.

5. The method of claim 1 further comprising:
   decoding the first image block based on said intra prediction.

6. The method of claim 5, the method further comprising receiving an information for accessing or defining an access to a neural network used for intra predicting.

7. A non-transitory computer readable medium containing data content generated according to the method of claim 3.

8. An apparatus comprising one or more processors, the one or more processors configured for:
   assigning a mask value to unavailable pixels in a context comprising pixels surrounding a first image block, wherein the mask value is outside a range of available pixels in the context;
   subtracting an average value of the available pixels in the context from the available pixels in the context;
   providing the context to at least one neural network;
   obtaining, from the at least one neural network, a second image block comprising intra prediction of the first image block; and
   post-processing the second image block by adding the average value to the intra prediction of the first image block.

9. The apparatus of claim 8, further comprising an encoder configured to encode the first image block based on the intra prediction.

10. The apparatus of claim 8, further comprising a decoder configured to decode the first image block based on the intra prediction.

11. The apparatus of claim 8, wherein the one or more processors are further configured for adapting the context values from a bit-depth of the first image block to a bit-depth of training images used for training said at least one neural network by scaling the context values before being input to the at least one neural network and inverse scaling the second image block after post-processing from the bit-depth of the training images to the bit-depth of the first image block.

12. A non-transitory computer readable medium comprising instructions which, when executed by a computer, cause the computer to carry out the method according to claim 1.

* * * * *